(12) United States Patent
Sufleta

(10) Patent No.: US 6,785,237 B1
(45) Date of Patent: Aug. 31, 2004

(54) METHOD AND SYSTEM FOR PASSIVE QUALITY OF SERVICE MONITORING OF A NETWORK

(75) Inventor: Zbigniew Sufleta, San Jose, CA (US)

(73) Assignee: Networks Associates Technology, Inc., Santa Clara, CA (US)

(*) Notice: Subject to any disclaimer, the term of this patent is extended or adjusted under 35 U.S.C. 154(b) by 0 days.

(21) Appl. No.: 09/539,838

(22) Filed: Mar. 31, 2000

(51) Int. Cl.[7] .................. H04L 12/26; H04L 12/56
(52) U.S. Cl. .................. 370/236; 370/252; 370/395.21
(58) Field of Search .................. 370/230, 231, 370/235, 236, 241, 252, 253, 254, 389, 395.1, 395.2, 395.21; 709/220, 224, 228

(56) References Cited

U.S. PATENT DOCUMENTS

| | | | |
|---|---|---|---|
| 5,097,469 A | | 3/1992 | Douglas |
| 5,287,506 A | | 2/1994 | Whiteside |
| 5,408,465 A | * | 4/1995 | Gusella et al. .............. 370/231 |
| 5,504,736 A | | 4/1996 | Cubbison, Jr. |
| 5,657,315 A | | 8/1997 | Waclawsky et al. |
| 5,740,346 A | | 4/1998 | Wicki et al. |
| 5,923,673 A | | 7/1999 | Henrikson |
| 6,088,622 A | * | 7/2000 | Dollin et al. .................. 700/28 |
| 6,097,699 A | * | 8/2000 | Chen et al. .................. 370/231 |
| 6,112,236 A | * | 8/2000 | Dollin et al. ............... 709/224 |
| 6,169,748 B1 | * | 1/2001 | Barbas et al. ............... 370/468 |
| 6,215,767 B1 | * | 4/2001 | Li ............................. 370/230 |
| 6,252,857 B1 | * | 6/2001 | Fendick et al. ............ 370/254 |
| 6,252,891 B1 | | 6/2001 | Perches ...................... 370/503 |
| 6,259,699 B1 | * | 7/2001 | Opalka et al. .............. 370/398 |
| 6,359,976 B1 | * | 3/2002 | Kalyanpur et al. ......... 379/134 |
| 6,363,429 B1 | * | 3/2002 | Ketcham .................... 709/235 |
| 6,385,647 B1 | * | 5/2002 | Willis et al. ................ 709/217 |
| 6,421,350 B1 | * | 7/2002 | Szurkowski et al. ........ 370/419 |

FOREIGN PATENT DOCUMENTS

| | | |
|---|---|---|
| EP | 0895376 A2 | 2/1999 |
| WO | WO 98/25355 | 6/1998 |

* cited by examiner

Primary Examiner—Alpus H. Hsu
(74) Attorney, Agent, or Firm—Blakely, Sokoloff, Taylor & Zafman LLP; Christopher J. Hamaty (57) ABSTRACT

A method and system for passive quality of service monitoring of a network are described. In one embodiment, a number of signatures are extracted from a number of network packets at a number of monitoring points. In addition, at least one quality of service parameter is generated based upon the signatures.

41 Claims, 9 Drawing Sheets

METHOD AND SYSTEM FOR PASSIVE QUALITY OF SERVICE MONITORING OF A NETWORK

FIELD OF THE INVENTION

The present invention relates to network management and, more particularly, to a system and method for passive quality of service monitoring of a network.

BACKGROUND OF THE INVENTION

As conventional networks have grown in size and complexity, the need for centralized management has grown. Part of that need for centralized management is the need for the policing of service level agreements for data transfer technologies, such as frame relay networks, to monitor quality of parameters. The quality of service parameters measure such values as one way packet travel time and the percentage of successful transmission of packet frames.

Customers of data delivery services are typically interested in monitoring quality of service parameters for the data network operated by a service provider in order to determine that the quality of delivery service they receive meets specific quantitative criteria. Two such quantitative criteria are one way packet transport latency and frequency of incidents of packet loss. Both parameters relate to the transport of data packets over a service provider's network between specific entry and exit points. Measuring one way packet transport latency on per-packet instance basis and detecting instances of dropped packets is difficult because it requires correlation of per-packet information observed at both the entry and exit points. Such measurements are typically performed by an active experiment in which a known traffic pattern is injected into the entry point in order to assess the relationship between the packet's instances injected into the network and their corresponding instances seen at the exit point. Measuring quality of service parameters through an active experiment does not represent a desired solution as the injected test traffic interferes with the regular operation of a monitored network.

What is required is a system and method to measure one way packet transport latency and detect incidents of packet dropping without using test patterns and through passive observations of regular customer traffic.

SUMMARY OF THE INVENTION

A method and system for passive quality of service monitoring of a network are described. In one embodiment, a number of signatures are extracted from a number of network packets at a number of monitoring points. In addition, at least one quality of service parameter is generated based upon the signatures.

BRIEF DESCRIPTION OF THE DRAWINGS

The features and advantages of the present invention will be apparent to one skilled in the art in light of the following detailed description in which:

FIG. 8b is a block diagram of a link information field packet frame of FIG. 8a.

DETAILED DESCRIPTION

A method and system for passive quality of service monitoring of a network are described. In one embodiment, a number of signatures are extracted from a number of network packets at a number of monitoring points. In addition, at least one quality of service parameter is generated based upon the signatures.

In the following detailed description of the present invention, numerous specific details are set forth in order to provide a thorough understanding of the present invention. However, it will be apparent to one skilled in the art that the present invention may be practiced without these specific details. In some instances, well-known structures and devices are shown in block diagram form, rather than in detail, in order to avoid obscuring the present invention.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general-purpose computer selectively activated or reconfigured by a computer program stored in the computer. The algorithms and displays presented herein are not inherently related to any particular computer or other apparatus. Various general-purpose machines may be used with programs in accordance with the teachings herein, or it may prove convenient to construct more specialized apparatus to perform the required method steps. The required structure for a variety of these machines will appear from the description below. In addition, the present invention is not described with reference to any particular programming language. It will be appreciated that a variety of programming languages may be used to implement the teachings of the invention as described herein.

Some portions of the detailed description that follows are presented in terms of algorithms and symbolic representations of operations on data bits within a computer memory in the form of a computer program. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

Figure 1:
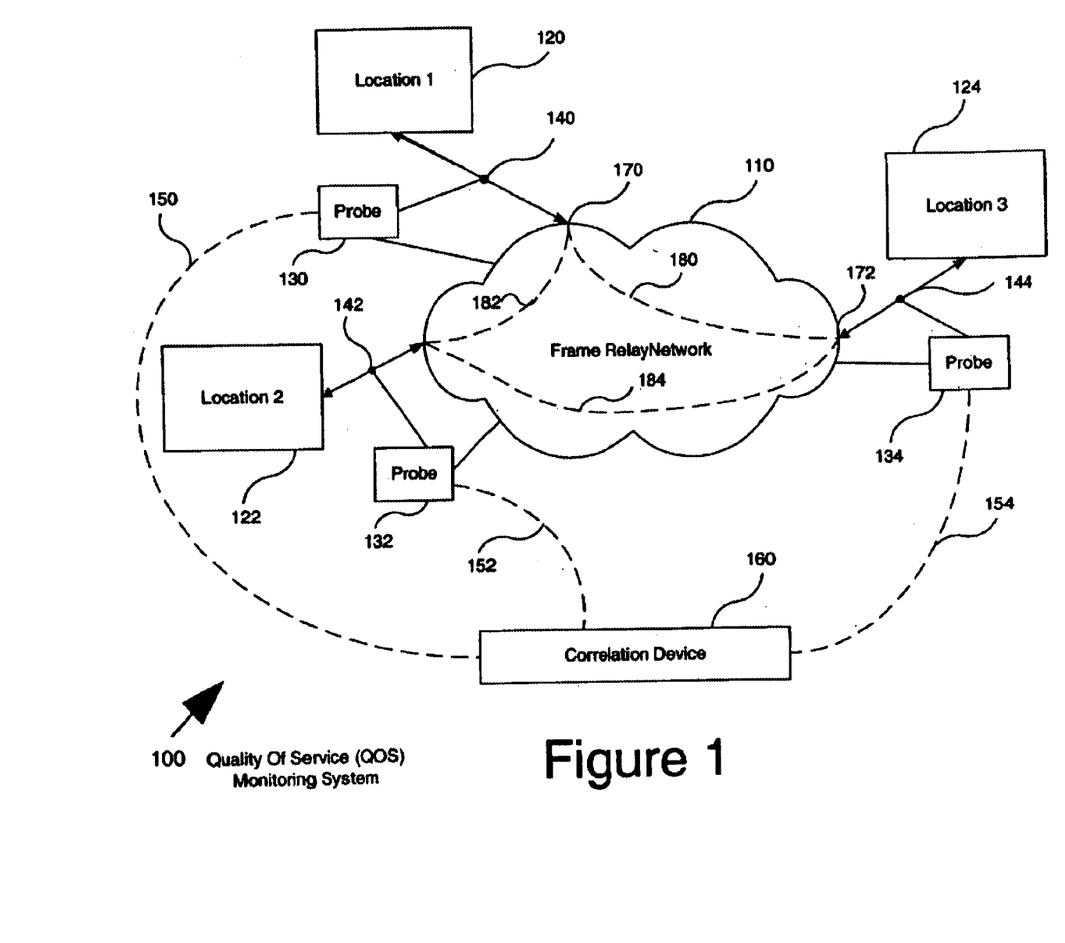
FIG. 1 is a block diagram of one embodiment for a quality of service monitoring system.

FIG. 1 is a block diagram of one embodiment for a passive quality of service monitoring system 100. Referring to FIG. 1, system 100 includes a number of locations 120, 122, 124 connected to a frame relay network 110. Locations (120–124) are connected to frame relay network 110 at user network interfaces (UNIs) 140, 142, 144. In addition, at UNIs 140–144, probes 130, 132, and 134 may be attached to monitor the quality of service within network 110. Locations 120–124 communicate through network 110 by means of permanent virtual circuits (PVCs) 180, 182, and 184. For example, data travels from location 1 (120) via PVC 180 to location 3 (124). The packet frames enter network 110 at monitoring point or ingress/egress point 170 and exit the network at monitoring point or ingress/egress point 172. In addition, data may flow in the opposite direction.

Probes 130–134 monitor traffic between locations 120–124 as the packet frames enter network 110. Probes 130–134 collect and send signature data about the process to correlation device 160. In one embodiment, the signature is a portion of the packet frame. The probes 130–134 send the data via quality of service (QOS) virtual data paths 150, 152, and 154. In one embodiment, the QOS parameters are generated and matched without injecting additional traffic between locations 120–124. In the example of FIG. 1, the QOS virtual data paths 150–154 are shown as outside of frame relay network 110; however, in one embodiment, the data travels through the network to correlation device 160. In an alternate embodiment, the data may travel via a separate control network.

Frame relay network 110 is based on a packet switching methodology and operates within the data link layer of the frame relay protocol. Service providers sell a service as connection-oriented virtual circuits (PVCs 180–184). Packet frames are relayed through switching devices within network 110. Linked locations 120–124 within frame relay network 110 provide a virtual private network (VPN). PVCs 180–184 begin and end at UNIs 140–144 and create a private line. The customer and service provider agree on a data capacity in advance which is called a committed information rate (CIR). PVCs 180–184 are logical point-to-point circuits between customer locations 120–124 and are low-delay circuits as routing decisions do not have to be made within network 110. Locations 120–124 may be corporate or customer sub-networks or individual workstations. The sub-networks may be connected through the frame relay network 110 based on physical media such as fractional T1 or T3 lines. Each UNI 140–144 contains a data link connection identifier (DLCI) which identifies the logical connections within network 110.

Probes 130–134 monitor packet frame traffic between locations 120–124 as the packet frames enter and exit network 110 at the UNIs 140–144. In one embodiment, probes 130–134 derive a unique signature for each packet frame seen at a given UNI 140–144. The signature information is transferred from probes 130–134 via QOS virtual data paths 150–154 to correlation device 160. Correlation device 160 matches the pairs of such signatures (for example, derived from ingress/egress point 170 to ingress/egress point 172) and develops the quality of service parameters for the network 110. For example, correlation device 160 measures the travel time and confirmation of delivery of a packet frame entering network 110 at ingress/egress point 170 and destined for location 3 (124) by receiving signature data from probe 130.

Assuming that PVC 180 has a DLCI of 76 at UNI 140 and DLCI 253 at UNI 144, probe 130 intercepts the frame at UNI 140 and transfers the signature data via QOS virtual data path 150 to correlation device 160. Similarly, probe 134 intercepts traffic at UNI 144 and transmits signature data via QOS virtual data path 154 to correlation device 160. Both probes 130 and 134 extract and temporarily store a signature of the frames. In one embodiment, the signature is a short piece of data derived from a portion of the frame that does not change from one location to the other. In an alternate embodiment, the signature may be the entire packet frame. In this embodiment, the signature is the constant content of the frame. However, sending the entire frame increases the traffic three-fold within network 110.

Probes 130–134 send periodic messages to correlation device 160 with sequences of signatures observed for a period of time on respected UNIs 140–144. Correlation device 160 knows the association between the probe numbers, DLCIs reported by the particular probes, and the PVCs 180–184. For example, correlation device 160 knows the PVC 180 between location 1 (120) and location 3 (124) will be reported by probe 130 as DLCI 76 and probe 134 as DLCI 253. Correlation device 160 constantly matches the signatures supplied by the probes 130–134 to confirm packet delivery and obtain packet travel time.

In one embodiment, probes 130–134 generate a time-stamp for the packet frames upon the frames ingress and egress from network 110. In order to maintain time domain synchronization of the probes 130–134, probes 130–134 are synchronized. In one embodiment, synchronization is maintained by using global positioning satellite (GPS) information. In an alternate embodiment, clock synchronization facilities maintained by the telecommunications network service providers may be used to maintain the probe 130–134 synchronization. In the discussion that follows, the data packets within the frames may also be referred to as protocol data units (PDUs), payloads, datagrams, or network layer protocol packets.

Figure 2:
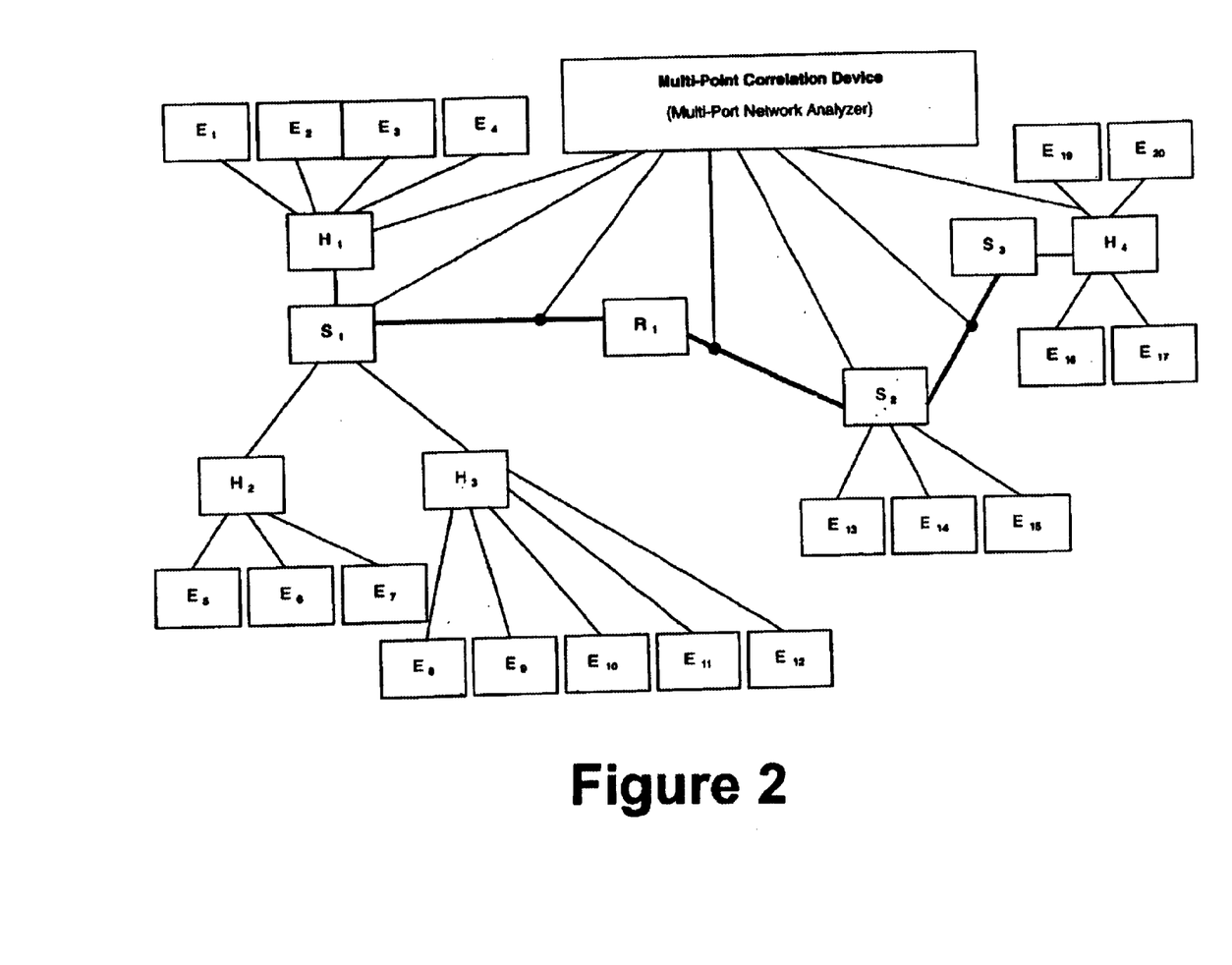
FIG. 2 is a block diagram of one embodiment for a local area network, quality of service monitoring system.

FIG. 2 is a block diagram of one embodiment for a local area network, quality of service monitoring system 200. Referring to FIG. 2, system 200 illustrates a general multi-segment network that involves both LAN switches (bridges) and inter-segment LAN routers. System 200 includes end-nodes E1 through E20 (202–240), hubs H1 through H4 (242–248), switches S1 through S3 (250–254), router R1 (260), and correlation device 270. In one embodiment, correlation device 270 is a multi-port network analyzer equipped with multiple network adapters (ports) to intercept network traffic at selected points. Links between switches 250–254 and correlation device 270 represent span-port arrangements (a span-port mirrors the traffic on a selected port of the switch for monitoring purposes). In the example of FIG. 2, there are no probes, i.e. separate dedicated devices designed to generate frame signatures and supply sets of such signatures to correlation device 270. Instead, correlation device 270 obtains access to full frames through its multiple network adapters. In an alternate embodiment, local area network monitoring system 200 may involve a combination of probes and local network adapters controlled by correlation device 270. In one embodiment, a network adapter used for frame interception, together with a layer of software that prepares frame signatures and passes them to the layer of software that performs signature correlation, may be treated as a virtual probe.

Data transfer performance monitoring may be used in the example of FIG. 2 to evaluate the impact of various traffic conditions on the performance of the deployed linking and switching/routing capacity. Several monitoring configurations are possible.

One of the configurations may involve measuring transfer delay and frame loss ratio along the path that connects two particular end-nodes 202–240 for all the traffic exchanged between such nodes or just for specific classes of frames. One of the end-nodes, for example E3 (206), may be a PC running a client database application while an other node, for example E19 (238), may be a database server. In this example, frames going from client E3 (206) to server E19 (238) may be tracked and vice versa along the path that involves hubs H1 (242) and H4 (248), switches S1 (250), S2 (252), S3 (254), and router R1 (260). Each section of a route may be characterized separately for its transfer delay and frame loss ratio. In this case, correlation device 270 may perform filtering that admits for analysis only the frames that are exchanged between nodes E3 (206) and E19 (238) and carry specific protocol data, characteristic for the database application under consideration. This kind of filtering is fairly common for network analyzers and involves, for example, source/destination addresses of the tracked end-nodes and the appropriate frame fields that identify the database application transactions. Frame signatures are used here in order to perform the correlation aimed at verifying that frames reach subsequent interception points and determining the per-path-section transfer delays. If the filtering scheme provides only the relevant frames to correlation device 270 (i.e. database transaction between the selected end-nodes), the signatures used may involve just the time stamp and some representation of the frame portion that does not change along the data path. Because there is no extra cost associated with delivering the monitored frames to correlation device 270, the entire unchanging portion of each frame may be used for frame correlation. However, because the correlation involves multiple instances of comparisons for a single frame (potentially high number of such instances for some frames), the use of small representation of frame payload benefits the monitoring performance. In one embodiment, the frame length may be used as a part of such small representation.

In an alternate embodiment, data transfer performance may be tracked for all database transactions executed between a number of end-nodes acting as database clients and a specific database server. If end-nodes E1 through E12 (202–224) represent potential database clients and E19 (238) is a database server then one may be interested in measuring transfer delays and frame loss ratio for all database transactions seen at two interception points, probe points may be established between S1 (250) and R1 (260) and between H4 (248) and E19 (238).

In this case, in addition to the proper filtering (to pick up only the frames representing database transactions exchanged between server E19 (238) and any of its clients), the frame signatures may contain some identification of a particular client. Such identification may be used to report results on per-client basis or just to strengthen the distinguishing ability of the frame signature.

In an alternate embodiment, the data transfer performance of arbitrary frame traffic present on the monitored network may be tracked. In this embodiment, arrangement leads to a slightly more complex task because, in order to perform any transfer delay or frame loss ratio measurements, sets of frame interception points are first established that are traversed by specific classes of frame traffic. In general, there is no rigid data paths for traffic crossing a given interception point. None of the frame interception points can be treated as a generic ingress or egress points for unspecified traffic. The notion of a virtual path has to be established separately for particular classes of traffic, e.g. traffic exchanged between two particular end-nodes. This can be done by manually configuring the system to associate specific interception points with specific classes of frames or automatically by special software. Such software that runs before any frame signature collection or interception is performed, may collect just the frame source and destination addresses seen at a collection of frame interception points and then group the interception points that are all traversed by frames of a given class. Such grouping can be provided on per traffic class basis so that a single interception point belongs to multiple groups.

Figure 3:
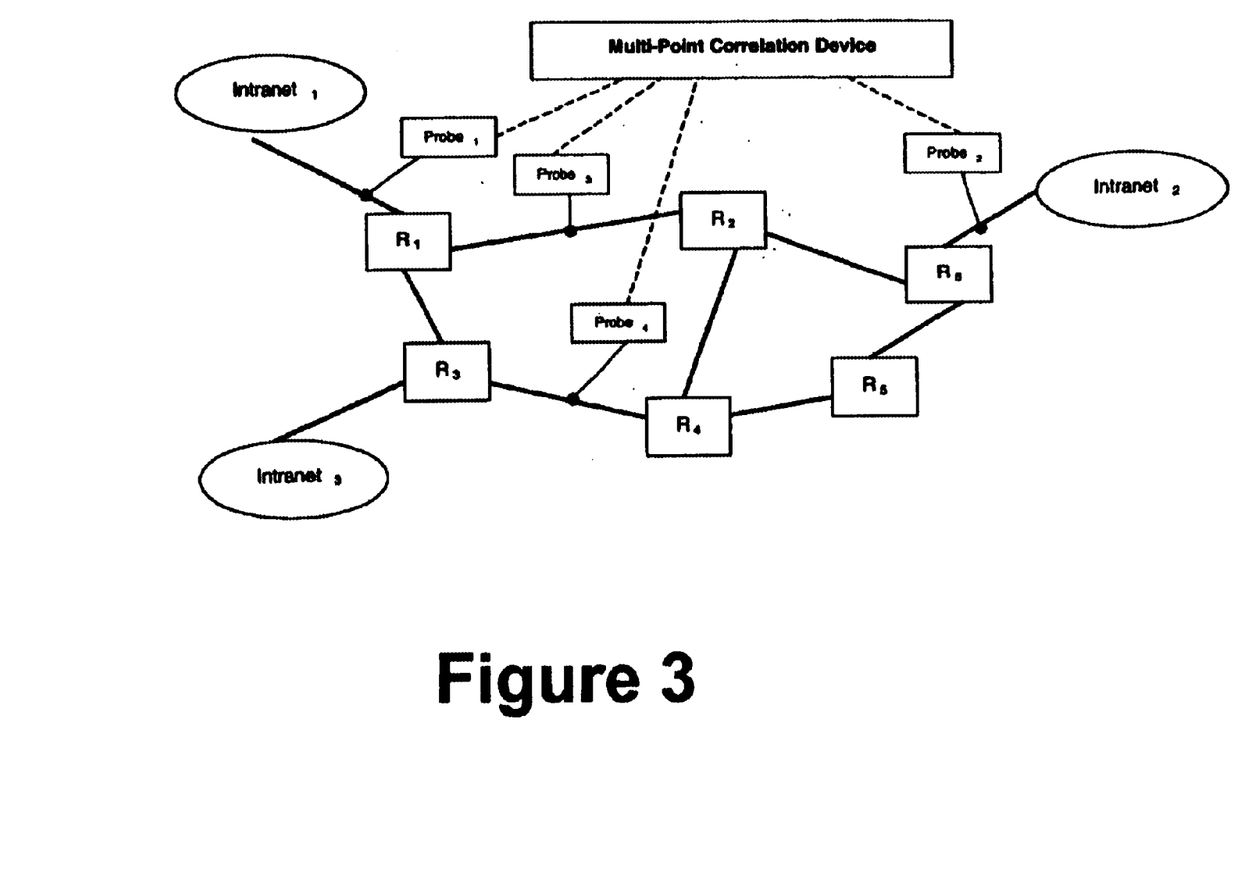
FIG. 3 is a block diagram of one embodiment for a wide area network, quality of service monitoring system.

FIG. 3 is a block diagram of one embodiment for a wide area network, quality of service monitoring system 300. Referring to FIG. 3, system 300 illustrates a monitoring system designed to monitor quality of service parameters of selected parts of a wide area network infrastructure, such as, for example, the Internet. System 300 includes IP routers R1 through R6 (310–320) and router-to-router links. In addition, system 300 includes intranets 302, 304, and 306 connected to the core routing fabric represents a dynamically changing configuration of traffic flows that may be subject to monitoring for data transfer performance. This kind of monitoring may be used to establish baseline data for capacity planning or for verification of how the provisions for so-called Differentiated Services (a way of introducing quality of service priorities for particular classes of traffic) translate into measurable quality of service characteristics for various traffic classes.

The monitoring is accomplished by deploying monitoring probes 330–338 connected to correlation device 340. From the standpoint of monitoring configuration, this is similar to the configuration described in reference to FIG. 1 except that it does not involve any rigid virtual circuits and involves possibly multiple probes along a data path for a particular network traffic flow. From the standpoint of monitoring objectives and technical challenges associated with tracking non-circuit traffic at multiple interception points, system 300 is similar to system 200. The monitored links in system 300 represent Internet highways connecting core routers and major intranets instead of intra-campus pipes connecting LAN segments though a fabric of tactical routers and bridges in system 200.

Figure 4:
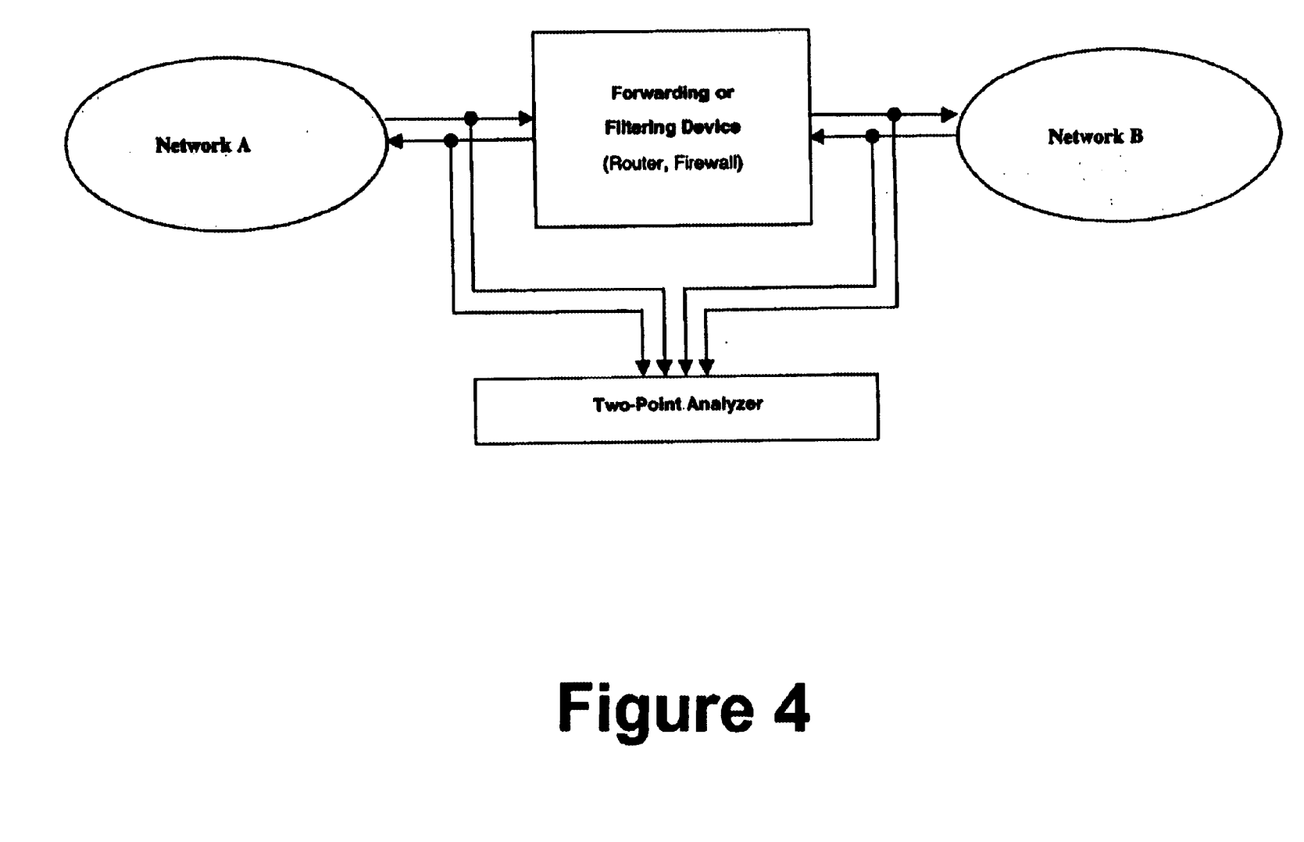
FIG. 4 is a block diagram of one embodiment for a chained device quality of service monitoring system.

FIG. 4 is a block diagram of one embodiment for a chained device quality of service monitoring system 400. Referring to FIG. 4, system 400 includes network A 402, network B 404, forwarding device 410, and analyzer 420. System 400 may be used to obtain transfer latency and packet drop ratio parameters for a given networking device under various traffic patterns generated by the device's being a part of a life network. The principles of deriving the latency and drop ratio parameters are the same as discussed in reference to FIG. 2. Similar to system 200, arranging the monitoring process as a combination of two activities as in system 400, generating packet signatures and correlating sets of such signatures, is a way of achieving efficiency of determining the needed parameters.

The description that follows will be discussed in terms of a frame relay network, however, those skilled in the art will realize that the embodiments described may be suitable to any type of network such as, for example, the network configurations described in reference to FIGS. 2, 3, and 4.

Figure 5:
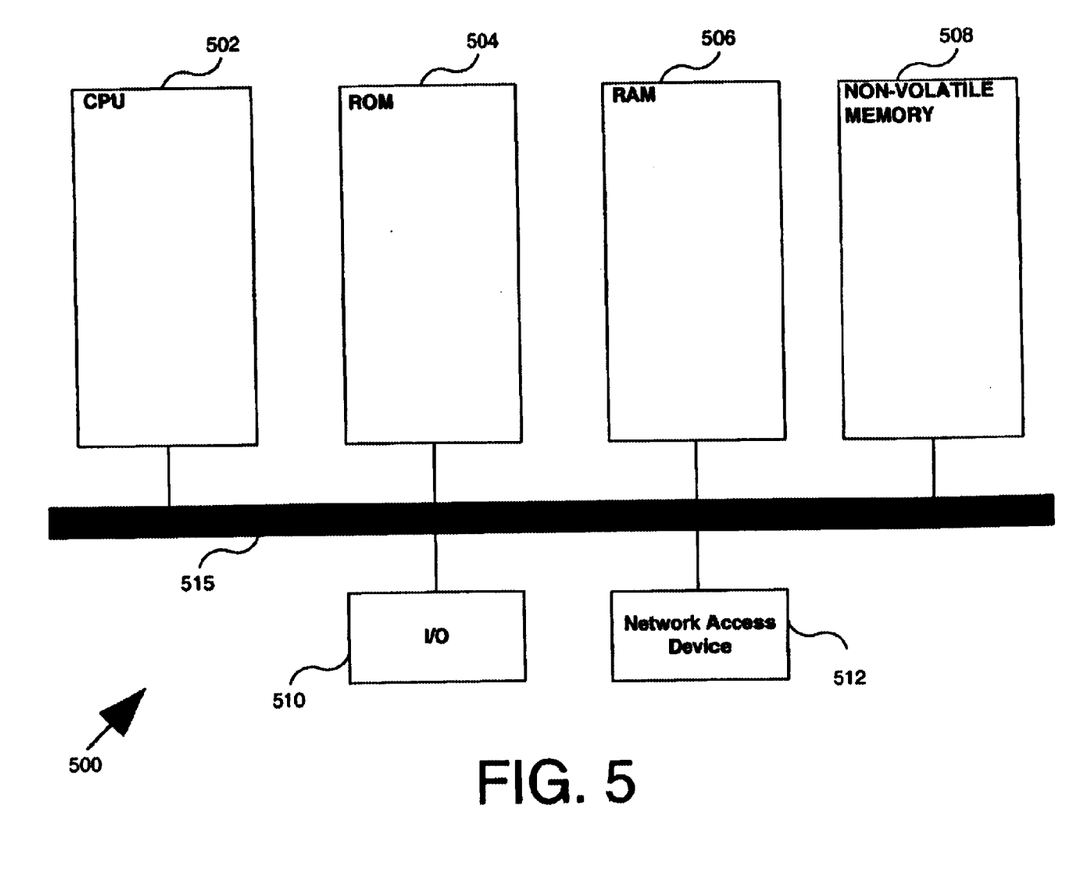
FIG. 5 is a block diagram of one embodiment for an architecture of a computer system.

FIG. 5 is a block diagram of one embodiment for an architecture of a computer system 500. Computer system 500 may be used in various capacities with the present invention. For example, computer system 500 may be a terminal used by a user to access locations 120–124 or for probes 130–134. Referring to FIG. 5, computer system 500 includes CPU 502 connected via bus 515 to a variety of memory structures in input/output 510. The memory structures may include, for example, read only memory (ROM) 504, random access memory (RAM) 506, and/or non-volatile memory 508. In one embodiment, CPU 502 is also connected via bus 515 to a network interface 512. Network interface 512 is used to communicate between computer system 500 and network 110 and correlation device 160. Network interface 512 may be connected to network 110 by any of a variety of means such as, for example, a telephone connection via modem, DSL line or the like.

Figure 6:
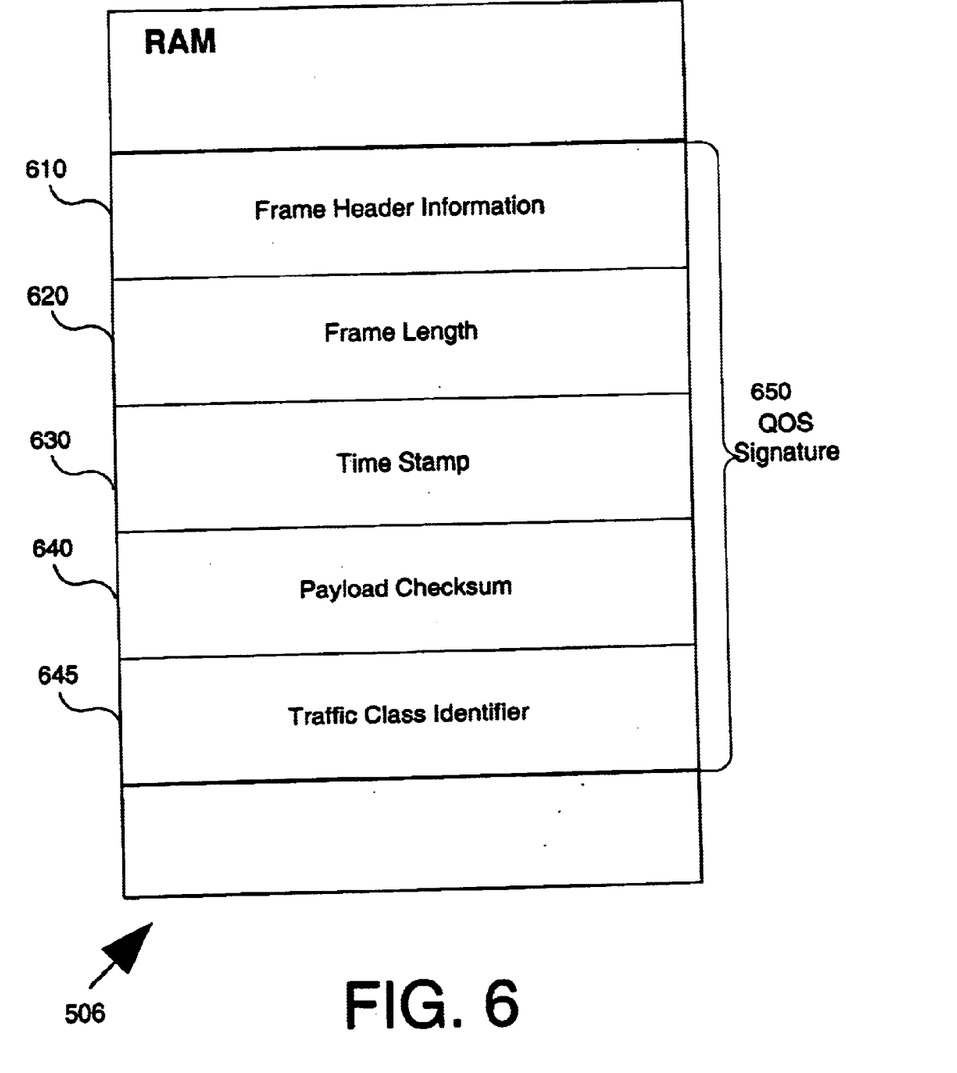
FIG. 6 is a block diagram of one embodiment for a random access memory (RAM) of FIG. 5.

FIG. 6 is a block diagram of one embodiment for a random access memory (RAM) 506 of FIG. 5. In one embodiment, RAM 506 includes quality of service (QOS) signature 650. QOS signature 650 is generated by probes 130–134 in order to send quality of service information to correlation device 160. In one embodiment, QOS signature 650 includes frame header information 610, frame link 620, time-stamp 630, payload checksum 640, and traffic class identifier 345. In one embodiment, frame header information 610 includes certain extracted information from the packet frame header including forward explicit congestion notification (FECN), backward explicit congestion notification (BECN), both of which warns the receivers about network congestion, and discard eligibility (DE). Frame length 620 includes the length of the packet frame. Frame length 620 may be used, together with frame header information 610, to increase QOS signature 650 uniqueness. In addition, frame length 620 may be used to modify QOS measurements as frames of shorter length may be handled differently than frames of longer length within a network. Time-stamp 630 is generated by a given probe for packets entering or exiting network 110 over a specific PCV. In one embodiment, time-stamp 630 represents the number of time ticks elapsed from the start of a QOS monitoring session. The resolution of time-stamping depends upon the UNI. Payload checksum 640 is calculated for the packet payload starting from the byte after the frame relay header and extending through the byte preceding the regular two-byte frame check sequence of the packet frame.

Payload checksum 640 may be unique to a given packet frame regardless of its interception point. Payload checksum 640, together with frame length 620, may result in a unique packet frame representation. However, two packets arriving close to each other may have the same checksum value. The representation is sufficient to distinguish a packet frame from other packet frames sent within a close time proximity as most payload protocols use a type of internal sequence number so that two packets carry essentially identical pieces of user data, their payload checksum 640 will be different. In one embodiment, calculating payload checksum 640 is performed by use of standard 32-bit format. In an alternate embodiment, the payload checksum 640 may be calculated from the frame check sequence (FCS) of the packet frame and adjusted to avoid dependency on the frame header. In this embodiment, the payload checksum 640 may also be derived as an independent checksum calculated using different polynomials over a small fixed size portion of the packet frame.

QOS signature 650 is a frame instance representation optimized for saving the bandwidth needed for supplying a correlation device with monitored traffic. This representation distinguishes a given frame instance from other frame instances intercepted in a close time proximity at a specific frame interception point. QOS signature 650 also provides some identification of a traffic class the frame belongs to (e.g. virtual path, host-to-host frame flow, etc.). It also provides time stamping information if one of the monitoring objectives is determining frame transfer delay. In one embodiment, QOS signature 650 may provide frame length 620 information as a means of enhancing the level of signature uniqueness or as extra information that may be used to relate the calculated quality of service parameters to particular frame size range.

In one embodiment, frame header information 610 distinguishes one frame from other frames intercepted within the same time interval of limited size and is in the center of the signature based passive quality of service monitoring scheme. Frame header information 610 may be invariant to any modifications that frames undergo along the data path that crosses all the frames interception points involved in traffic monitoring for the traffic class that such frames belong. In one embodiment, this parameter is unique for a given frame in the context of frames intercepted around a given point in time. However, absolute uniqueness is not universally achievable in all networking environments. Two frames may be found for which the portion that stays constant along the transfer path is identical for both frames. The absolute uniqueness is also not necessary for carrying out adequate evaluation of frame loss ratio or frame transfer delay. In addition, this parameter should be as concise as possible because of the impact of this parameter's size on the use of monitoring network bandwidth and efficiency of frame matching procedures. In one embodiment, frame header information 610 is a function of frame's invariant portion. In some cases this function is protocol independent, e.g. CRC or generic hush function. In some cases, this function is established with some protocol in mind, e.g. for TCP frames belonging to a given TCP connection an excellent frame instance content derivative is the sequence number value provided in the TCP header.

In one embodiment, traffic class identifier 645 is used if the quality of service monitoring involves multiple packet classes seen at the same set of packet interception points. If the data gathered by the probes is filtered with a specific traffic class in mind, there is no need to supply traffic class identifier 645 with each packet signature, thus, reducing the size of QOS signature 650. Also, if the probes report packets belonging to different traffic classes in clusters where each cluster contains data for only a single traffic class, there is no need to supply traffic class identifier 645 with each packet signature 650. For example, traffic class identifier 645 is not required for Frame Relay DLCIs, identifiers of Internet traffic flows (e.g. a vector that involves source address, destination address, source port number, destination port number, and upper layer protocol ID), and MPLS label value for label switched paths in Multi-Protocol Label Switching. In some embodiments, the correlation device may agree with the probes on a certain way of encoding traffic class identifiers 645 such that the identifier size is very small. For the Internet traffic flows, the probes may report the full flow description vectors of the seen flows to the correlation device and the correlation device may impose short (e.g. two-byte) index numbers for representing each vector in packet signature 650.

In one embodiment, correlation device 160 uses timestamp 630 contained in the signatures 650 not only to confirm delivery calculation travel time, but also to intelligently search the repository of signatures 650 to minimize the processing time and dispose signatures as soon as possible. In one embodiment, signature 650 is 12 bytes in length. This length represents at least a ten to one data reduction over the entire frame for the average network traffic where packet length averages between 100 and 300 bytes. That is, the amount of signature data that has to be transferred over the network 110 from probes 120–124 to correlation device 160 may represent up to 10% of the actual monitored user traffic. In one embodiment, the quality of service monitoring is performed continually. In an alternate embodiment, the quality of service monitoring may be done on a sampling basis. In this embodiment, the 10% overhead is minimal compared to the overall data traffic on the network 110.

In an alternate embodiment, a reasonable bandwidth-conscious scheme of passing signatures from probes to the correlation device may send signatures in clusters that involve traffic of a single traffic class (e.g. a specific DLCI). In this embodiment, bandwidth is reduced by not repeating traffic class identifier 645 for every single frame. In addition, the time stamps may be provided as variable-length counts that are relative to the previous frame in a cluster. The cluster may come with an absolute count for reliability but each individual frame uses a time-stamp value that is typically very short because of the variable-length format and relative nature of the counts. In this embodiment, only longer pauses between frames would require longer time stamps in this scenario. However, longer pauses would mean that the network is not fully utilized so the bandwidth needed for monitoring will be lower also. In a frame relay network, time stamps may be reduced to average size between one and two bytes by using the approach described above. In addition, the frame length may be reported in variable-length format or even as the length-class-ID rather than the exact length value. The length class can be also used to scale the per-frame size of frame header information 610. For example, frames of 64 bytes and below may be represented by a one-byte checksum, frames between 65 and 128 bytes may be represented by a two-byte checksum, etc. Using this embodiment, the average frame QOS signature 650 size for frame relay and other similar networks may be reduced to between 5 and 6 bytes. This may result in the reduction ratio of 40:1 for traffic patterns that show the average frame size of a little bit more than 200 bytes.

Figure 7:
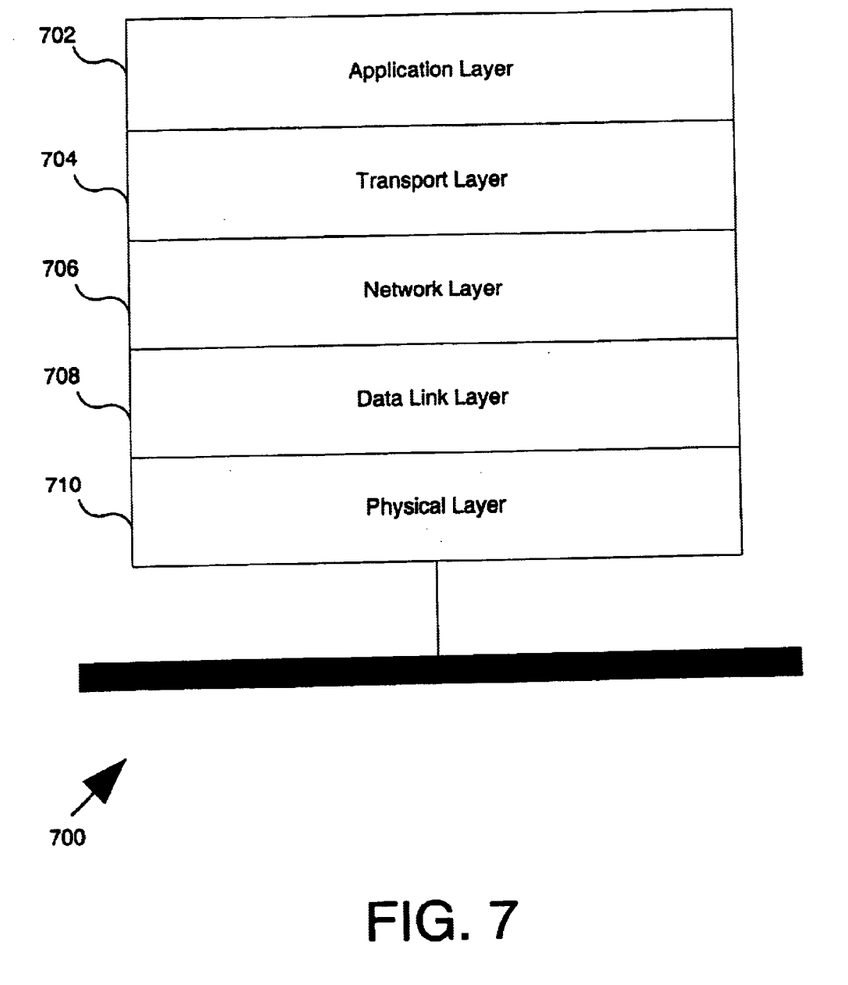
FIG. 7 is a block diagram of a protocol layer stack.

FIG. 7 is a block diagram of a protocol layer stack 700. Referring to FIG. 7, protocol stack 700 includes application layer 702, transport layer 704, network layer 706, data link layer 708, and physical layer 710.

Application layer 702 may consist of standard communication applications. These and other application protocols may make use of the services of standard transport protocols such as transmission control protocol (TCP) and user datagram protocol (UDP) contained within transport layer 704. Both TCP and UDP make use of standard services of transmission protocols at the network layer 706. Between network layer 706 and physical layer 710 is data link layer 708. Data link layer 708 specifies the protocol for communicating frames of data between various network locations using the transport protocol.

As information passes down through the layers of the protocol stack 700, each layer encapsulates the information in the form of a protocol data unit (PDU). Entries in each layer encapsulate prior information with new protocol control information into the PDU. When PDUs arrive at another network node, the PDU moves up through the layers of the protocol stack 700 and the information for each layer is stripped off the PDU and passed to the appropriate layer entry.

Figure 8A:
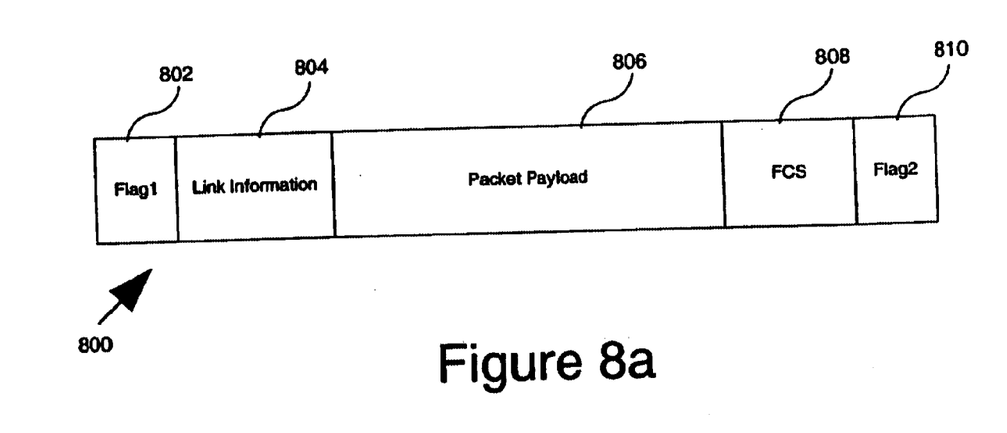
FIG. 8a is a block diagram of a packet frame.

FIG. 8a is a block diagram of a packet frame 800. Referring to FIG. 8a, packet frame 800 includes flag 1 (802), link information 804, payload 806, frame check sequence (FCS) 808, and flag 2 (810). Flag 1 (802) is a field that holds a starter frame marker for frame 800. Link information 804 includes fields for holding the logical connection address and control fields of frame 800. Payload 806 contains the data information received from application layer 702 for transport over network 110. FCS 808 is a checksum used for error detection of the entire frame 800 and flag 2 (810) is a field that holds the end of frame marker for frame 800.

Figure 8B:
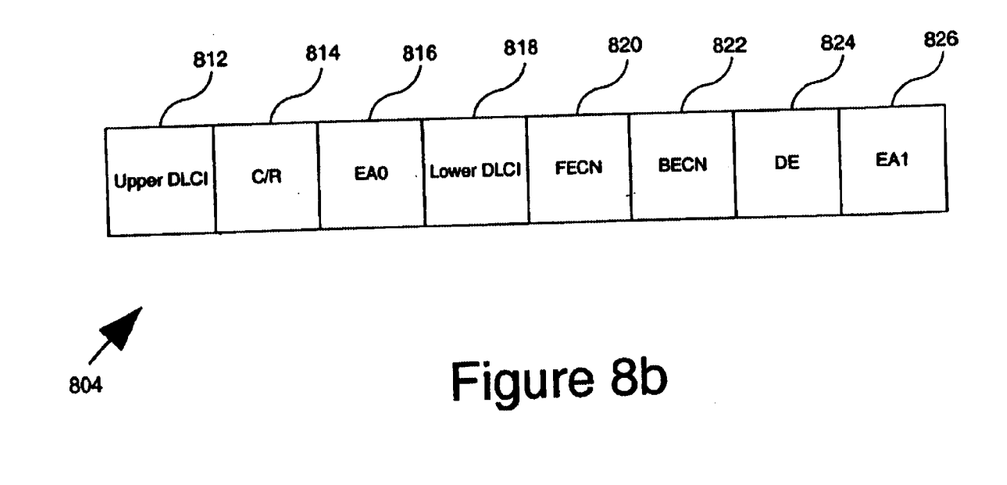

FIG. 8b is a block diagram of link information field 804 of packet frame 800. Referring to FIG. 8b, link information 804 includes upper DLCI 812, command/response bit (C/R) 814, extended address 0 (816), lower DLCI 818, forward explicit congestion notification (FECN) 820, backward explicit congestion notification (BECN) 822, discard eligibility (DE) 824, and extended address 1 (826). Upper DLCI 812 and lower DLCI 818 contain the address that identifies the logical connection of the location 120–124. Upper and lower DLCI (812, 818) identify the PVC 180–184 that connects two points over the frame relay 110. The values contained within DLCIs (812 and 818) are defined by the customer's equipment and has meaning only between the equipment and the first frame relay switch. Frame relay network 110 uses the DLCI 812, 818 to look up the path from one location to another. C/R 814 is a bit related to the congestion control and EA 0 (816) and EA 1 (826) are used to extend the header field to support DLCI addresses of more than ten bits. FECN 820 and BECN 822 are fields that contain network congestion information. DE 824 indicates whether frames may be discarded if the network is congested.

Figure 9:
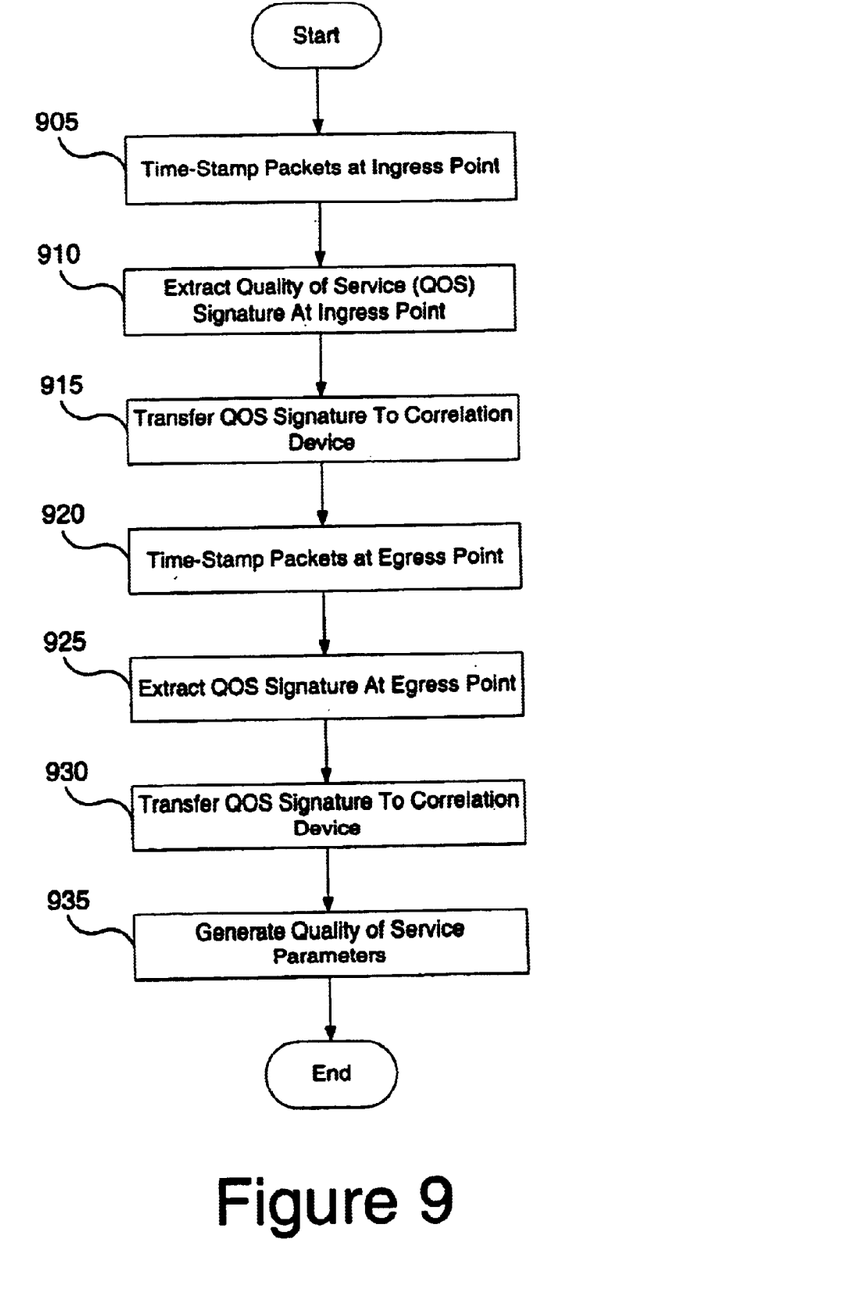
FIG. 9 is a flow diagram of one embodiment for monitoring quality of service parameters.

FIG. 9 is a flow diagram of one embodiment for monitoring quality of service parameters. Initially at processing block 905, a packet frame is received by probe 130 and time-stamped at ingress/egress point 170.

At processing block 910, quality of service (QOS) signature 650 is extracted at the ingress point. In one embodiment, the frame header information is extracted from the frame and placed in frame header information 610, frame length is extracted and placed in frame length 620, and a payload checksum is calculated and placed in payload checksum 640. At processing block 915, QOS signature 650 of the packet frame at the ingress point is transferred to correlation device 160.

At processing block 920, packet frames are extracted at an egress point and time-stamped. Operations are similar to that described above for block 905.

At processing block 925, QOS signature 650 is extracted for packet frames at the egress points. Operations are similar to that described above for processing block 910. At processing block 930, QOS signature 650 of the packet frames exiting at the egress point are transferred to correlation device 160.

At processing block 935, correlation device 160 generates the quality of service parameters by extracting and matching information of quality of service signatures 650 received from probes at both the ingress and egress points. In one embodiment, correlation device 160 constantly receives QOS signatures 650 from all probes on the system. Correlation device 160 matches the information and generates the quality of service parameters for traffic between each location 120–124 within system 100. In one embodiment, correlation device 160 creates one way packet travel time and the number of packets successfully transferred or dropped over the network 110 for each PVC 180–184. In one embodiment, blocks 905 through 915 are processed independently and/or concurrently with blocks 920 through 930. In one embodiment, the QOS parameters are generated and matched without injecting additional traffic between locations 120–124.

Again referring to FIG. 1, for example, probe 130 time-stamps all packet frames entering network 110 at UNI 140. In addition, probe 130 extracts the QOS signature 650 information from packet frames 800 at UNI 140. Probe 130 then transfers the QOS signatures 650 to correlation device 160. This corresponds to processing block 905–915 above.

Concurrently with the extraction of information by probe 130, probe 134, for example, extracts similar information as frames 800 exit network 110 at ingress/egress point 172. Probe 134 time-stamps the packet frames 800 as they exit network 110. Probe 134 extracts QOS signature 650 information for packets exiting network 110 at UNI 144 and transmits the QOS signatures 650 to correlation device 160. This corresponds to processing blocks 920–930 above.

Correlation device 160 then generates the quality of service parameters (corresponding to processing block 935). Correlation device 160 matches a given packet frame that entered at UNI 140 with a packet frame that exited at UNI 144 by comparing the information within QOS signature 650. If the frames match, the correlation device 160 determines the time required for transfer over PVC 180 by subtracting the time-stamp of the entering frame from the time-stamp of the exiting frame. This difference generates the one-way packet travel time. In addition, by being able to match a given ingress packet frame with an egress packet frame, over time, correlation device 160 can determine the number of packets that are successfully transferred over PVC 180.

The specific arrangements and methods herein are merely illustrative of the principles of this invention. Numerous modifications in form and detail may be made by those skilled in the art without departing from the true spirit and scope of the invention.

What is claimed is:

1. A method for passive quality of service monitoring of a network, the method comprising:

creating a plurality of signatures from a plurality of network packets transmitted through the network at a plurality of monitoring points, each signature comprising at least a portion of constant content in a corresponding packet, a checksum calculated from a payload in the corresponding packet, and a time-stamp; and generating at least one quality of service parameter for the network based upon the plurality of signatures.

2. The method of claim 1 wherein, for each of the plurality of signatures, the constant content in a corresponding network packet comprises one of a header and the payload for the corresponding network packet.

3. The method of claim 1 wherein generating at least one quality of service parameter is performed on a per-packet basis.

4. The method of claim 1 wherein generating at least one quality of service parameter does not introduce additional network packets between nodes of the network.

5. The method of claim 1 wherein each of the plurality of signatures for a frame network further comprises a total frame length, and a traffic class identifier, and the constant content comprises frame header information.

6. The method of claim 1 wherein creating the plurality of signatures further comprises:

time-stamping the plurality of network packets at each of the plurality of monitoring points.

7. The method of claim 1 wherein generating at least one quality of service parameter further comprises:

matching at least one signature from an first monitoring point of the plurality of monitoring points with at least one signature from a second monitoring point of the plurality of monitoring points; and computing a one-way packet travel time.

8. The method of claim 1 wherein generating at least one quality of service parameter further comprises:

matching at least one signature from an first monitoring point of the plurality of monitoring points with at least one signature from a second monitoring point of the plurality of monitoring points; and computing a lost packet percentage.

9. A method for passive quality of service monitoring of a network, the method comprising:

creating a plurality of ingress signatures from a plurality of network packets entering the network at an ingress point;

creating a plurality of egress signatures from the plurality of network packets at an egress point, the plurality of network packets having traversed the network from the ingress point to the egress point; and generating at least one quality of service parameters for the network based upon the plurality of ingress signatures and the plurality of egress signatures, wherein each signature comprises at least a portion of constant content in a corresponding packet, a checksum calculated from a payload in the corresponding packet, and a time-stamp.

10. The method of claim 9 wherein generating at least one quality of service parameter is performed on a per-packet basis.

11. The method of claim 9 wherein generating at least one quality of service parameter does not introduce additional network packets between nodes of the network.

12. The method of claim 9 wherein, for each of the plurality of ingress signatures, the constant content in a corresponding network packet comprises one of a header and the payload for the corresponding network packet.

13. The method of claim 9 wherein for each of the plurality of egress signatures, the constant content in a corresponding network packet comprises one of a header and the payload for the corresponding network packet.

14. The method of claim 9 wherein creating the plurality of ingress signatures further comprises:

time-stamping the plurality of network packets at the ingress point.

15. The method of claim 9 wherein creating the plurality of egress signatures further comprises:
    time-stamping the plurality of network packets at the egress point.

16. The method of claim 9 wherein generating at least one quality of service parameter further comprises:
    matching at least one ingress signature with at least one egress signature; and
    computing a one-way packet travel time.

17. The method of claim 9 wherein generating at least one quality of service parameter further comprises:
    matching at least one ingress signature with at least one egress signature; and
    computing a lost packet percentage.

18. The method of claim 9 wherein each of the plurality of ingress signatures for a frame network comprises a total frame length, and a traffic class identifier, and the constant content comprises frame header information.

19. The method of claim 9 wherein each of the plurality of egress signatures for a frame network comprises a total frame length, and a traffic class identifier, and the constant content comprises frame header information.

20. An article of manufacture including one or more computer-readable media with executable instructions therein, which when executed by a processing device causes the processing device to:
    create a plurality of signatures from a plurality of network packets transmitted through the network at a plurality of monitoring points, each signature comprising at least a portion of constant content in a corresponding packet, a checksum calculated from a payload in the corresponding packet, and a time-stamp; and
    generate at least one quality of service parameters for the network based upon the plurality of signatures.

21. An article of manufacture including one or more computer-readable media with executable instructions therein, which when executed by a processing device causes the processing device to:
    create a plurality of ingress signatures from a plurality of network packets entering the network at an ingress point;
    create a plurality of egress signatures from the plurality of network packets at an egress point, the plurality of network packets having traversed the network from the ingress point to the egress point; and
    generate at least one quality of service parameters for the network based upon the plurality of ingress signatures and the plurality of egress signatures, wherein each signature comprises at least a portion of constant content in a corresponding packet, a checksum calculated from a payload in the corresponding packet, and a time-stamp.

22. A system for passive quality of service monitoring of a network, the system comprising:
    means for creating a plurality of signatures from a plurality of network packets transmitted through the network at a plurality of monitoring points, each signature comprising at least a portion of constant content in a corresponding packet, a checksum calculated from a payload in the corresponding packet, and a time-stamp; and
    means for generating at least one quality of service parameters for the network based upon the plurality of signatures.

23. A system for passive quality of service monitoring of a network, the system comprising:
    means for creating a plurality of ingress signatures from a plurality of network packets entering the network at an ingress point;
    means for creating a plurality of egress signatures from the plurality of network packets at an egress point, the plurality of network packets having traversed the network from the ingress point to the egress point; and
    means for generating at least one quality of service parameters for the network based upon the plurality of ingress signatures and the plurality of egress signatures, wherein each signature comprises at least a portion of constant content in a corresponding packet, a checksum calculated from a payload in the corresponding packet, and a time-stamp.

24. A system for passive quality of service monitoring of a network, the system comprising:
    a plurality of probes to create a plurality of signatures from a plurality of network packets transmitted through the network at a plurality of monitoring points, each signature comprising at least a portion of constant content in a corresponding packet, a checksum calculated from a payload in the corresponding packet, and a time-stamp; and
    a correlation device to generate at least one quality of service parameter for the network based upon the plurality of signatures.

25. The system of claim 24 wherein, for each of the plurality of signatures, the constant content in a corresponding network packet comprises one of a header and the payload for the corresponding network packet.

26. The system of claim 24 wherein the correlation device generates the at least one quality of service parameter on a per-packet basis.

27. The system of claim 24 wherein the correlation device generates the at least one quality of service parameter without introducing additional network packets between nodes of the network.

28. The system of claim 24 wherein each of the plurality of signatures for a frame network comprises a total frame length, and a traffic class identifier, and the constant content comprises frame header information.

29. The system of claim 24 wherein the plurality of probes time-stamp the plurality of network packets at each of the plurality of monitoring points.

30. The system of claim 24 wherein the correlation device further matches at least one signature from an first monitoring point of the plurality of monitoring points with at least one signature from a second monitoring point of the plurality of monitoring points, and computes a one-way packet travel time.

31. A system for passive quality of service monitoring of a network comprising:
    a first probe to create a plurality of ingress signatures from a plurality of network packets entering the network at an ingress point;
    a second probe to create a plurality of egress signatures from the plurality of network packets at an egress point, the plurality of network packets having traversed the network from the ingress point to the egress point; and
    a correlation device to generate at least one quality of service parameters for the network based upon the plurality of ingress signatures and the plurality of egress signatures, wherein each signature comprises at least a portion of constant content in a corresponding packet, a checksum calculated from a payload in the corresponding packet and a time-stamp.

32. The system of claim 31 wherein the correlation device generates the at least one quality of service parameter on a per-packet basis.

33. The system of claim 31 wherein the correlation device generates the at least one quality of service parameter without introducing additional network packets between nodes of the network.

34. The system of claim 31 wherein, for each of the plurality of ingress signatures, the constant content in a corresponding network packet comprises one of a header and the payload for the corresponding network packet.

35. The system of claim 31 wherein, for each of the plurality of egress signatures, the constant content in a corresponding network packet comprises one of a header and the payload for the corresponding network packet.

36. The system of claim 31 wherein the first probe time-stamps the plurality of network packets at the ingress point.

37. The system of claim 31 wherein the second probe time-stamps the plurality of network packets at the egress point.

38. The system of claim 31 wherein the correlation device further matches at least one ingress signature with at least one egress signature, and computes a one-way packet travel time.

39. The system of claim 31 wherein the correlation device further matches at least one ingress signature with at least one egress signature, and computes a lost packet percentage.

40. The system of claim 31 wherein each of the plurality of ingress signatures for a frame network comprises a total frame length, and a traffic class identifier, and the constant content comprises frame header information.

41. The system of claim 31 wherein each of the plurality of egress signatures for a frame network comprises a total frame length, and a traffic class identifier, and the constant content comprises frame header information.

* * * * *